United States Patent Office

2,906,701
Patented Sept. 29, 1959

2,906,701

PROCESS FOR REFORMING HYDROCARBONS WITH CATALYSTS COMPRISING ALLOYS OF PLATINUM AND GERMANIUM

Harrison M. Stine, Cleveland, Harold Arthur Strecker, Bedford, and Robert B. Faris, Jr., Solon, Ohio, assignors to The Standard Oil Company, Cleveland, Ohio, a corporation of Ohio No Drawing. Application December 12, 1958
Serial No. 779,870

4 Claims. (Cl. 208—138)

This invention relates to a process for the conversion of light naphtha, and the hydrocarbons contained therein, especially the $C_5$ and $C_6$ and to some extent the $C_7$ hydrocarbons.

There has been a continuing need in the petroleum industry to upgrade the quality or octane number of liquid hydrocarbon fuels such as gasoline. Numerous reforming or conversion processes have been developed whereby the molecular structures of naturally occurring petroleum hydrocarbons boiling in the gasoline range are altered to provide a product having a higher octane number. Such reforming processes have been particularly effective in the conversion of heavy naphthas, characterized herein as those hydrocarbons having from 8 to 12 carbon atoms per molecule, or a stock, 80% of which boils within the range of about 225 to 450° F. Several well-known catalysts for this purpose comprise platinum or molybdenum. The conversion of light petroleum naphthas, stocks the hydrocarbons of which have primarily from 5 to 7 carbon atoms per molecule, or a stock 80% of which boils between 50 and 225° F., has not seen as much development.

It is an object, therefore, to provide a process for reforming light naphtha, and the hydrocarbons contained therein, in which the primary reaction is hydroisomerization.

When any naphtha is subject to any reforming process, the products, under ambient conditions of temperature and pressure, will consist of gas, coke, and converted and unconverted liquid hydrocarbons, and the same considerations apply for light naphtha.

The fraction of the feed which is chemically altered is a measure of catalyst activity; the fraction which is converted to wanted or useful products is a measure of catalyst selectivity. Ideally, a catalyst should have high activity and high selectivity. In actual practice, however, these two properties generally vary inversely and it is often necessary to effect a compromise. For example, it may be more economic to sacrifice activity for selectivity in order to minimize the loss which results from conversion to coke and gas. If high conversions are more important than the gas and coke losses associated with such yields, then a catalyst having high activity and low selectivity may be preferred.

The present invention relates to a method of reforming petroleum light naphtha which comprises contacting the light naphtha with the herein defined catalyst at temperatures ranging from 700 to 1050° F. in the presence of added hydrogen. Various reactions occur when the hydrocarbons are contacted with said catalyst, for example; molecular rearrangement of the hydrocarbons, coking, cracking, gas formation, etc., the effect obtained depending on the temperature of the reaction and other conditions. Hydroisomerization is obtained as the primary reaction with temperatures from about 725 to 850° F. in the presence of added hydrogen.

The catalyst used in the process of the invention is optimum for both activity and selectivity and comprises 0.1 to 10% by weight of a solid solution of platinum and germanium on a support, the proportion of platinum in the solid solution may be in the range of from 5 to 95% by weight. Palladium may be substituted for all or a part of the platinum in this catalyst and is the equivalent of platinum. The catalyst may or may not contain halides such as chloride and fluoride.

Light naphtha contains normal paraffins, cycloparaffins, isoparaffins, and aromatics. The normal paraffins have particularly low octane numbers. The more desirable types of hydrocarbons are olefins, cycloparaffins, aromatics, and isoparaffins. There is little advantage in converting aromatics to cycloparaffins or vice versa. Olefins are of questionable value in a gasoline and the conversion of normal paraffins to isoparaffins, therefore, is the most desirable reaction.

The presence of added hydrogen prevents dehydrogenation as a substantial reaction, and any rearrangement of the molecular configuration results in saturated hydrocarbons. The amount of added hydrogen should be sufficient to provide at least ½ mol of $H_2$ per mol of hydrocarbon. There is no upper limit but there is no advantage in exceeding 10 mols $H_2$/mol of hydrocarbon. The total pressure may be from 150 to 750 p.s.i.g. The space velocity is not critical and may be from 0.1 to 10 v.v.h., preferably .5 to 2.5.

The catalyst used in the process of this invention is described in application Serial No. 706,254, filed December 31, 1957, of which this is a continuation-in-part and may be prepared using any acceptable support. The supports composited with the platinum solid solutions may be natural or synthetic in nature. These supports may be chemically inert, or they may possess catalytic activity. Natural supports, for example, comprise bentonite, bauxite, clays, kieselguhr, zeolites, etc.; and synthetic supports comprise activated alumina, silica-alumina, silica, charcoal, magnesia, zirconia, thoria, etc. These supports may be used singularly or in combination. The usual supports comprise alumina, silica-alumina, and silica and alumina of high activity is preferred. The alumina may contain chloride if it is made from aluminum chloride.

Catalyst preparation processes are widely varied and, for example, would include separate or co-precipitation, impregnation, etc. The catalyst is preferably manufactured by precipitating the platinum and germanium on the support while it is in the form of a wet gel. After drying, the catalyst is treated to co-reduce the compounds and heat-treated to form the solid solution, which is characteristic of the catalyst of the invention. Co-reduction and heat-treating may be conducted simultaneously or in separate steps.

When the catalyst is made by impregnating a support, the latter may be in either pulverulant or pellet form and is preferably heated prior to impregnation at an elevated temperature for a period of time to drive off moisture. This pretreatment or activation assures more uniform adsorption of impregnating solutions by the support.

The impregnating solution consists of a volatile liquid solvent, such as water, having dissolved therein soluble compounds of platinum, such as chloroplatinic acid, and of germanium, such as germanium tetrachloride. These soluble compounds will, upon decomposition or chemical reduction, preferably form no other solid except that of the metal itself. Non-metallic decomposition products will be volatilized and removed by the subsequent heat treatment of the impregnated support.

When the platinum and germanium are incorporated with the support in the form of a wet gel, the mixture may be extruded in the form of pellets, and the latter dried and heat-treated.

The amount of solid solution on the support may vary between wide limits. As described in our above-mentioned co-pending application, a range of 0.1 to 10%, based on the weight of support, has been found operable, although for economic reasons a range of 0.1 to 2.0% is preferred. The relative amount of germanium may range from 5 to 95%, based on the weight of the solid solution. The preferred ranges vary with the temperature at which the solid solution is formed on the support. The preferred ranges are 10 to 75% when formed at about 1000° F. and 25 to 80% when formed at 1500° F.

The amounts may also be expressed in terms of percent of platinum and germanium in terms of the support. In general, the amounts of platinum should be above 0.20% but there is no advantage in going above 0.7%. Amounts in the range of 0.25 to 0.4 seem optimum. The amount of germanium may be from 0.01 to 0.5%, preferably 0.05 to 0.3%.

The catalyst is dried by heating. Thereafter, the metal compounds are reduced by further heating in a reducing atmosphere, for example, in an atmosphere of hydrogen, and the catalyst is heated to a temperature in excess of 800° F., such as at about 1000° F. and not over that temperature at which an appreciable amount of the metal vaporizes from the support. This upper temperature will seldom exceed 2100° F.

The dried catalyst may be co-reduced and heat-treated in separate steps, such as by reducing the catalyst in an atmosphere of hydrogen and heat-treating the catalyst in an atmosphere of nitrogen, or air. The steps may be inverted. However, co-reduction and the final heat treatment may be conducted simultaneously by heating the catalyst in a hydrogen atmosphere.

The heat treatment imparts an unexpected improvement in catalytic activity. It is thought that the heat treatment achieves more intimate admixture of the metals and in some cases causes them to alloy or enter into a solid solution form more completely. The exact state of admixture is unknown, but for satisfactory catalytic activity, it is believed to be that state which results from the co-reduction and heating of a support containing compounds of platinum and germanium, and such a state is referred to herein as a solid solution.

Co-reduction of large or commercial quantities of the metal compounds may be incomplete, thereby leaving small concentrations of the initial ingredients on the support. Furthermore, when the catalysts are regenerated (removal by air oxidation of the coke deposited on the catalyst in a reforming reaction), some of the metals may be converted to their respective oxides. Concentrations of the metals as expressed herein relate to either metal in whatever form it may exist.

The catalyst used in the process of the invention will be better understood from the following examples:

CATALYST PREPARATION A–D

Table I below summarizes the composition for five different catalysts, using alumina as a support, catalyst A being produced by the method of the present invention except that only platinum is used as the catalyst metal, catalyst B, C, and D, inclusive, being representative of the catalysts of the present invention. Since all catalysts were made in a similar manner, only the preparation of catalyst B will be explained in detail, as it is representative of each preparation except where indicated.

*Support.*—The support consisted of 100 grams of pellets of alumina in the form of cylinders measuring about 1/8 inch in diameter and 1/8 inch in length. They were "activated" by heating to a temperature of about 1100° F. for six hours, after which their surface area ranged from about 150 to 200 m.²/gm.

*Impregnating solution.*—The impregnating solution was prepared by mixing 0.732 gram of germanium tetrachloride, $GeCl_4$, containing 0.25 gram of germanium, with 19.95 grams of an aqueous solution containing 1.995 grams of chloroplatinic acid, $H_2PtCl_6 \cdot 6H_2O$ (containing 0.75 gram of platinum), and sufficient concentrated hydrochloric acid to solubilize the germanium salt and to bring the total volume up to about 40 ml.

*Impregnation.*—The 40 ml. of the impregnating solution was added to 100 grams of the "activated" alumina support. The mixing in these proportions gave a damp catalyst. It appeared that the catalyst was thoroughly saturated with the solution. None of the impregnating solution drained away from the damp catalyst.

*Heat treatment.*—The damp catalyst was first heated overnight in air at about 250° F. Then it was heated in an atmosphere of hydrogen at 1000° F. for 10 hours. The resulting catalyst had a solid solution concentration of 1%, based on the weight of the support, and a surface area of about 100 m.²/gm. The solid solution itself consisted of 25% germanium and 75% platinum.

Table I

| Catalyst | Impregnating solution components, grams/100 gm. alumina support | | Alloy metal conc. in weight percent of support | |
|---|---|---|---|---|
| | $H_2PtCl_6 \cdot 6H_2O$ | $GeCl_4$ | Ge | Pt |
| A | 2.660 | | | 1.00 |
| B | 1.995 | 0.732 | 0.25 | 0.75 |
| C | 1.330 | 1.464 | 0.5 | 0.5 |
| D | 0.665 | 2.196 | 0.75 | 0.25 |

In order to show the effect of heat-treating temperature on catalyst activity, samples of both catalysts A and C, which had been heat-treated at 1000° F., were further subjected to a temperature of 1500° F. for 20 hours in an atmosphere of hydrogen. Their surface areas, thereafter, averaged 80–85 m.²/gm. Other samples were heat-treated at 1800° F. in an atmosphere of hydrogen, after which they had average surface areas of about 25 m.²/gm.

CATALYST PREPARATION E 708 grams of $AlCl_3 \cdot 6H_2O$ was dissolved in 800 cc. of distilled $H_2O$. The solution was added with vigorous stirring to 1400 cc. of a 50/50 15 normal $NH_4OH/H_2O$ solution over a period of 30 minutes. The alumina gel was aged for 24 hours and filtered, and washed with 4 liters of 1% $NH_4OH$ and 2 liters of distilled water. The filter cake was slurried in 400 cc. of distilled water and 5 cc. glacial acetic acid diluted with 25 cc. water was added with stirring and the slurry stirred for 15 minutes. 13.95 grams of 10% aqueous chloroplatinic acid was diluted to 50 cc. with distilled water and $H_2S$ bubbled through this solution for 4 minutes to precipitate the platinum. The resulting mixture was stirred into the alumina slurry and the slurry stirred for 15 minutes. To the slurry was then added 0.622 gram of $GeCl_4$ in 50 cc. of acetone and the slurry stirred for 15 minutes. (The Ge is precipitated.) The slurry is then homogenized for 5 minutes and filtered. The resulting wet cake is dried for 16 hours at 220° F. and then for 6 hours at 300° F. The dried catalyst is broken up and heat-treated at 950° F. for 5 hours and co-reduced as described in the previous examples. This gave the catalyst used in run No. 1053–82 in Table II.

Other catalysts were prepared in the same manner except that different amounts of chloroplatinic acid and germanium chloride were employed to give the catalyst described in Table II. When the catalyst did not contain germanium the step of adding germanium chloride to the slurry was omitted.

HYDROISOMERIZATION EXAMPLES

These catalysts were then used to hydroisomerize a synthetic light naphtha composed of a mixture of equal parts by weight of normal pentane and normal hexane. The temperature at which the reaction was carried out in each instance is also indicated in Table II. In all cases, the reactor pressure was 500 p.s.i.g.; the feed rate was 1 v.v.h.; and mol ratio of $H_2$/hydrocarbon was 1.7. The results are shown in Table II.

Table II

| Run No. | Amount of metals on alumina support | Temp., °F. | Liquid yield, percent | Conversion to $iC_5+iC_6$, percent | Selectivity, percent |
|---|---|---|---|---|---|
| 1053-93 | 0.35% Pt—0% Ge | 800 | 51.2 | 33.5 | 39 |
| 1053-96 | 0.7% Pt—0% Ge | 800 | 73.4 | 46.4 | 62 |
| 1053-75 | 0.35% Pt—0.07% Ge | 800 | 92.9 | 55.7 | 93 |
| 1092-2 | 0.35% Pt—0.1% Ge | 800 | 94.5 | 52.0 | 94 |
| 1076-46 | 0.35% Pt—0.24% Ge | 800 | 95.4 | 52.6 | 94 |
| 1076-15 | 0.7% Pt—0.14% Ge | 800 | 93.6 | 59.9 | 95 |
| 1076-18 | 0.28% Pt—0.14% Ge | 800 | 93.6 | 55.4 | 94 |
| 1053-92 | 0.35% Pt—0% Ge | 750 | 64.1 | 29.9 | 43 |
| 1053-82 | 0.35% Pt—0.14% Ge | 750 | 93.6 | 46.4 | 94 |

A comparison of run 1053-93 with 1053-96 shows that doubling the amount of platinum gives some improvement but it is not particularly significant. However, a comparison of run 1053-93 with runs 1053-75, 1092-2 and 1076-46 shows that a small amount of germanium gives markedly superior results. In each instance, the total amount of the combination of platinum and germanium is less than .7%, yet the results are superior to those of run 1053-96. This is especially significant considering the fact that germanium is relatively inexpensive compared with platinum.

A comparison of run 1053-96 with run 1076-15 shows that at the higher platinum level, the germanium still imparts a marked improvement, although this shows that the amount of platinum need not be as high as 0.7% in order to obtain good results.

Run 1076-18 shows that lower amounts of platinum can be used successfully. However, indications are that the amount should be above 0.20 in order to prevent a marked falling off in the yield, conversion and selectivity.

Runs 1053-92 and 1053-82 demonstrate that the same improvement is obtained at lower temperatures.

The process of the invention was also carried out using relatively pure pentane. The catalyst employed was made as described under Example E, and contained 0.35% platinum and 0.16% germanium on alumina. The variables and results are shown in Table III:

Table III

| Expt. No. | | 1162-22 | 1162-23 | 1162-19 |
|---|---|---|---|---|
| Temp., °F. | | 800 | 825 | 750 |
| Press., p.s.i.g. | | 500 | 500 | 500 |
| Space velocity, v.v.h. | | 1 | 1 | 1 |
| $H_2$/hydrocarbon ratio | | 0.92 | 0.92 | 0.92 |
| | Feed material | | | |
| Products, weight percent on feed: | | | | |
| Dry gas (<$C_4$) | | 1.4 | 3.0 | 0.4 |
| $C_4$ | | 0.7 | 1.7 | 0.4 |
| iso-$C_5$ | 0.9 | 54.7 | 56.2 | 37.4 |
| N-$C_5$ | 97.4 | 42.0 | 38.0 | 60.5 |
| $C_6$ | 2.7 | 1.2 | 1.0 | 1.5 |
| Selectivity, percent | | 97 | 93 | 98 |
| $C_5$+ liquid: | | | | |
| Yield, vol. percent on feed | | 97.8 | 95.8 | 99.2 |
| F-1 octane number, clear | 61.9 | 82.2 | 83.5 | 76.2 |

As showing the effect of pressure and hydrogen/hydrocarbon ratio the same catalyst was used with the conditions shown in the following table and results:

Table IV

| Expt. No. | | 1162-82 | 1162-83 | 1162-84 | 1162-85 | 1162-86 |
|---|---|---|---|---|---|---|
| Temp., °F. | | 840 | 840 | 840 | 840 | 840 |
| Press., p.s.i.g. | | 500 | 500 | 500 | 750 | 250 |
| Space velocity, v.v.h. | | 4 | 4 | 4 | 4 | 4 |
| $H_2$/HC mole ratio | | 0.92 | 2.0 | 0.5 | 0.92 | 0.92 |
| | Feed material | | | | | |
| Products, weight percent on feed: | | | | | | |
| Dry gas (<$C_4$) | | 1.1 | 1.9 | 1.2 | 1.4 | 1.3 |
| $C_4$ | | 0.6 | 2.7 | 0.5 | 1.2 | 1.0 |
| iso-$C_5$ | 0.9 | 47.2 | 24.2 | 49.0 | 46.9 | 46.7 |
| n-$C_5$ | 97.4 | 49.8 | 69.5 | 47.9 | 49.2 | 49.2 |
| $C_6$ | 2.7 | 1.3 | 1.7 | 1.7 | 1.4 | 1.8 |
| Selectivity, percent | | 97 | 83 | 97 | 95 | 95 |
| $C_5$+ liquid | | 98.8 | 95.5 | 98.8 | 97.9 | 98.2 |

The catalyst of the invention can readily be regenerated and in many instances give superior results after regeneration.

The catalyst was prepared as described in Example E containing 0.35% platinum and 0.16% germanium on alumina. Following hydroisomerization with this catalyst until activity declined, the catalyst was regenerated by burning at slightly below 950° F. with 1.9 vol. percent oxygen in nitrogen for 16 hours, followed by burning at this temperature for one hour with air.

The catalyst was then used to hydroisomerize a mixture of approximately equal parts of normal pentane and normal hexane under a variety of conditions with the following results:

Table V

| Experiment No. | | 1027-59 | 1027-61 | 1027-62 | 1027-63 |
|---|---|---|---|---|---|
| Temp. °F. | | 750 | 800 | 800 | 850 |
| Press., p.s.i.g. | | 250 | 500 | 500 | 750 |
| v.v.h. | | 0.5 | 1.0 | 1.0 | 2.0 |
| $H_2$/HC ratio | | 1.0 | 1.0 | 1.0 | 1.0 |
| | Feed analysis | | | | |
| Products, weight percent on feed: | | | | | |
| $C_1$-$C_3$ | | 1.9 | 2.1 | 2.4 | 4.6 |
| $C_4$ | | 1.8 | 2.2 | 2.4 | 3.5 |
| iso-$C_5$ | 0.2 | 20.4 | 25.2 | 23.6 | 26.9 |
| n-$C_5$ | 49.5 | 29.4 | 23.9 | 26.2 | 22.5 |
| iso-$C_6$ | 0.5 | 27.6 | 31.4 | 28.1 | 29.4 |
| n-$C_6$ | 48.8 | 18.4 | 14.5 | 16.7 | 12.6 |
| cyclo-$C_6$ | 1.0 | 0.5 | 0.7 | 0.6 | 0.5 |
| $C_5$+ liquid: | | | | | |
| Yield, vol. percent | | 96.0 | 95.4 | 95.3 | 92.1 |
| Octane number F-1 leaded | 75.8 | 89.6 | 92.2 | 91.6 | 95.2 |

From the above, it will be seen that the catalyst gives good results after regeneration.

We claim:

1. A process for reforming petroleum naphtha which includes the step of contacting said naphtha with a catalyst composition comprising a support and a solid solution comprising germanium and a metal selected from the group consisting of platinum and palladium, said solution being present in an amount within the range of 0.1 to 10% by weight of the support and containing at least 5% of each of the components of said solution, under reforming conditions.

2. The process of claim 1 in which said reforming conditions comprise a temperature within the range of 700 to 1050° F. and a space velocity within the range of 0.1 to 10 v.v.h.

3. A process for hydroisomerizing light petroleum naphtha which comprises contacting said naphtha at a temperature within the range of 700 to 1050° F. and in the presence of added hydrogen with a catalyst composition comprising a support and a solid solution comprising germanium and a metal selected from the group consisting of platinum and palladium, said solid solution being present in an amount within the range of 0.1 to 10% by weight of the support and containing at least 5% by weight of each of the components of said solution.

4. A process for hydroisomerizing light petroleum naphtha which comprises contacting said naphtha at a temperature within the range of 725 to 850° F. and in the presence of added hydrogen in an amount of at least ½ mol of $H_2$/mol hydrocarbon with a catalyst composition comprising an alumina support and a solid solution comprising germanium and platinum, said solid solution containing 0.2 to 0.7% by weight of platinum and 0.01 to 0.5% by weight of germanium based on the alumina support.

References Cited in the file of this patent

UNITED STATES PATENTS 2,337,191     Greensfelder et al. _____ Dec. 21, 1943